United States Patent
Pawar et al.

(10) Patent No.: US 7,933,221 B1
(45) Date of Patent: Apr. 26, 2011

(54) REGULATING DATAFLOW BETWEEN A MOBILE DEVICE AND A WIRELESS TELECOMMUNICATIONS NETWORK

(75) Inventors: Hemanth Balaji Pawar, Herndon, VA (US); Shilpa Kowdley Srinivas, Herndon, VA (US); Badri Prasad Subramanyan, Overland Park, KS (US); Piyush Upadhyay, Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 121 days.

(21) Appl. No.: 12/195,815

(22) Filed: Aug. 21, 2008

(51) Int. Cl.
*G06F 11/00* (2006.01)

(52) U.S. Cl. ......... 370/253; 370/235

(58) Field of Classification Search ........ 370/253, 370/328, 229, 209, 401, 342, 236; 455/435.1; 709/225
See application file for complete search history.

(56) References Cited

U.S. PATENT DOCUMENTS

| | | | | |
|---|---|---|---|---|
| 7,406,088 B2 * | 7/2008 | Magd et al. | | 370/401 |
| 7,574,208 B2 * | 8/2009 | Hanson et al. | | 455/435.1 |
| 2006/0072451 A1 * | 4/2006 | Ross | | 370/229 |
| 2006/0083192 A1 * | 4/2006 | Dinescu et al. | | 370/328 |
| 2006/0274640 A1 * | 12/2006 | Sliva | | 370/209 |
| 2007/0070908 A1 * | 3/2007 | Ghosh et al. | | 370/236 |
| 2007/0274257 A1 * | 11/2007 | Bae et al. | | 370/328 |
| 2007/0283014 A1 * | 12/2007 | Shinomiya et al. | | 709/225 |
| 2009/0086651 A1 * | 4/2009 | Luft et al. | | 370/253 |
| 2009/0103507 A1 * | 4/2009 | Gu et al. | | 370/342 |

* cited by examiner

*Primary Examiner* — Kwang B Yao
*Assistant Examiner* — Syed M Bokhari (57) ABSTRACT

A method and medium are provided for regulating a flow of data traffic that is communicated between a mobile device and a wireless telecommunications network. The method includes performing a data-packet-inspection process on at least a portion of the flow and applying a network policy to a specific wireless telecommunications area based on the results of the inspection. The network policy may be based on the wireless coverage area, the application, or the subscriber from which a data-packet originates. The network policy should also determine the way in which to regulate the flow of data if a policy applies to that particular flow. To enforce the policy, the value of a reverse activity bit may be set in connection with the wireless coverage area so as to regulate the flow of data as dictated by the network policy.

18 Claims, 8 Drawing Sheets

REGULATING DATAFLOW BETWEEN A MOBILE DEVICE AND A WIRELESS TELECOMMUNICATIONS NETWORK

SUMMARY

Embodiments of the invention are defined by the claims below, not this summary. A high-level overview of embodiments of the invention are provided here for that reason, to provide an overview of the disclosure.

In a first aspect, a set of computer-useable instructions provides a method of regulating a flow of data traffic that is communicated between a mobile device and a wireless telecommunications network that includes performing a packet-inspection process on at least a portion of the flow, wherein the packet-inspection process includes selecting at least one data-packet from a plurality of data-packets within the flow and inspecting an attribute of the at least one data-packet, which attributes include one or more of a user identifier that identifies a user associated with the mobile device, an application identifier that identifies an application that helps facilitate the flow, a mobile device identifier that identifies the mobile device, and a sector identifier that identifies a portion of the wireless coverage area; and based on the data-packet attribute, determining whether to enforce a network policy such that if the data-packet attribute is a first value, then the network policy will be enforced but if the data-packet attribute is a second value, then the network policy will not be enforced.

In another embodiment, a method for regulating a flow of data traffic is provided. The method includes inspecting an attribute of a data-packet that forms a portion of a flow of data traffic; referencing the attribute against a set of network policies, wherein the network policies are based on at least one of the following: a sector from which the data-packet originates, an application from which the data-packet originates, and a subscriber from which the data-packet originates; and based on the referencing, regulating the flow of data traffic consistent with the network policies, wherein the regulation of the flow involves setting a value of a reverse activity bit (RAB) associated with the flow of data traffic.

In another embodiment, a set of computer-useable instructions provides a method of regulating a flow of data traffic that is communicated between a mobile device and a wireless telecommunications network, the method comprising: receiving a flow of data-packets from at least one mobile device in the wireless coverage area; inspecting attributes of each data-packet in the flow, wherein at least a user identifier, an application identifier, a mobile device identifier, and a sector identifier are available for inspection for each packet; based on the values of one or more of the attributes, determining whether or not to enforce a network policy; and enforcing the network policy by way of setting a value for a reverse activity bit (RAB) associated with the flow.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of the present invention provide a method and computer-readable media for regulating the flow of data traffic communicated between a mobile device and a wireless telecommunications network. This is accomplished by performing a data-packet-inspection process on at least a portion of the flow of data traffic and regulating the flow based on the inspection.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AN | Access Node |
| BTS | Base Transceiver Station |
| CDMA | Code Division Multiple Access |
| DPI | Deep Packet Inspection |
| EV-DO | Evolution Data Optimized |
| MD | Mobile Device |
| PDN | Packet Data Network |
| RNC | Radio Network Controller |
| VoIP | Voice Over IP |

Further, various technical terms are used throughout this description. An illustrative resource that fleshes out various aspects of these terms can be found in *Newton's Telecom Dictionary* by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
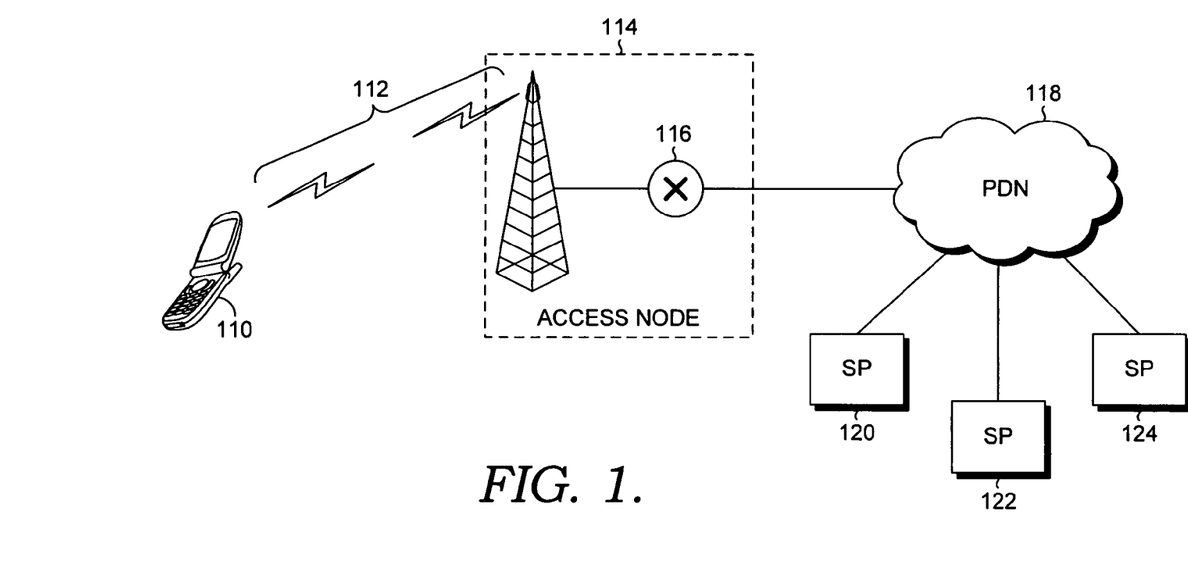
FIG. 1 depicts an illustrative operating environment in which the flow of data traffic communicated between a mobile device and a wireless telecommunications network may be regulated in accordance with an embodiment of the invention.

FIG. 1 depicts an illustrative operating environment in which the flow of data traffic communicated between a mobile device and a wireless telecommunications network may be regulated. The environment includes mobile device 110 in communication 112 with access node (AN) 114. The access node is connected to a Packet Data Network (PDN) 118, which is connected to a plurality of service providers 120, 122, and 124. Note that additional network entities not depicted in FIG. 1 could be present as well. Additionally, there could be more than one mobile device in communication with the access node, and there could be additional service providers in communication with the PDN. There could also be one or more routers, switches, or other devices or networks making up at least part of the one or more communication links.

Mobile device 110 could be a cell phone, a PDA, a computer, a laptop computer, or some other communications device. In general, mobile device 110 includes a user interface, a wireless communications interface, a processor, and a data storage component in one embodiment. The user interface may include buttons, a touch screen, a microprocessor, or other elements. The wireless communication interface may comprise an antenna and a chipset for communicating with one or more access nodes over an air interface. For instance, the chipset could be suitable for engaging in Evolution Data Optimized (EV-DO) communications, including IS-856m Rel. 0 or IS-856, Rev. A communications. The chipset or wireless communication interface, in general, may be able to communicate with a Code Division Multiple Access (CDMA) network, a Wi-Fi network, or one or more additional types of wireless networks. The processor and data storage component may be any suitable component known to those of skill in the art.

Access node 114 may be any one or any combination of network elements. As such, the access node may include a communication interface, a processor, and a data storage component. The communication interface may include one or more antennas, chipsets, or other components for providing one or more EV-DO coverage areas such as cells or sectors for communicating with mobile devices. The communication interface may also include a wired packet interface such as an Ethernet interface for communicating directly, or over one or more networks with the PDN. Access node 114 may include one or more base transceiver stations (BTS) as well as one or more radio network controllers (RNC). The access node may provide service including IS-856m Rel. 0 or IS-856, Rev. A service to EV-DO mobile devices on a number of carriers and a number of wireless coverage areas such as cells or sectors. The access node also includes a data-packet-inspection component 116 such as a Data Packet Inspection (DPI) router.

The PDN 118 may include one or more networks, which might be of different types, such as wide-area networks, local-area networks, public networks such as the Internet, private networks, wired networks, wireless networks, or networks of any other variety. Devices in communication with the packet-data network may exchange data using a packet-switched protocol such as an IP and may be identified by an address such as an IP address. The service providers 120, 122, and 124 may be any third-party providers providing services such as web services, Voice Over IP (VoIP) services, or other data services.

Figure 2:
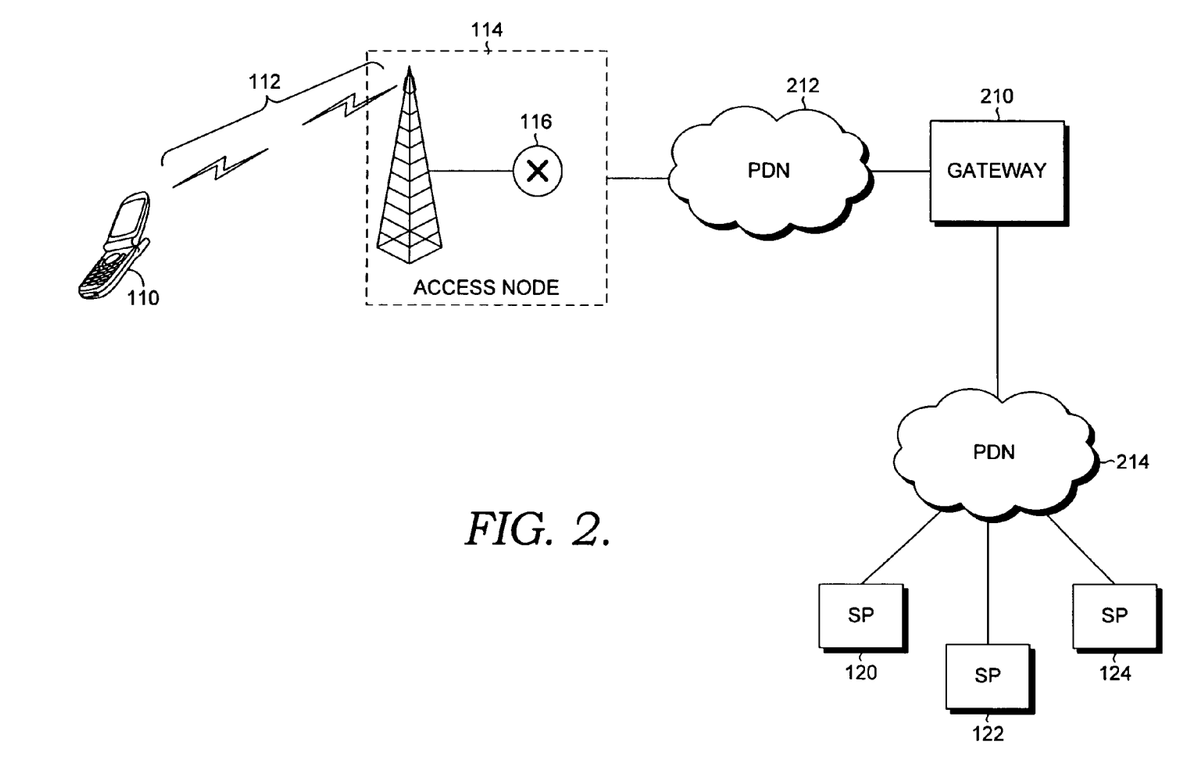
FIG. 2 depicts an alternate illustrative operating environment in which the flow of data traffic communicated between a mobile device and a wireless telecommunications network may be regulated in accordance with an embodiment of the invention.

An alternate illustrative operating environment is depicted in FIG. 2. This environment further comprises a PDN 212 connected to gateway 210 which is further connected to second PDN 214. The gateway 210 may be any networking server or any other device arranged to connect multiple networks. The gateway may include a communication interface, a processor, and a data storage component. The interface may include a wired packet-data interface such as an Ethernet interface for communicating over the PDN. Additional gateways and networks are not depicted but could be present as well.

Figure 3:
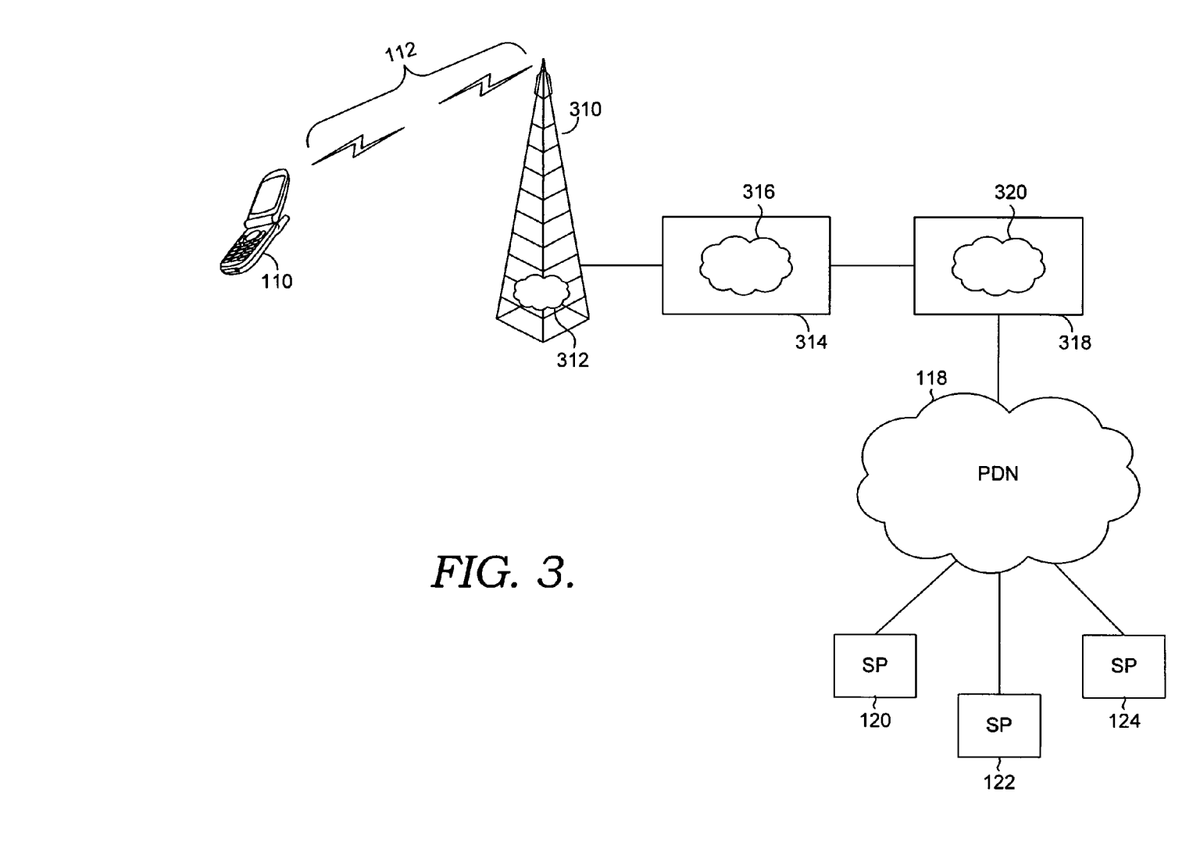
FIG. 3 depicts yet another alternate illustrative operating environment in which the flow of data traffic communicated between a mobile device and a wireless telecommunications network may be regulated in accordance with an embodiment of the invention.

FIG. 3 depicts yet another illustrative operating environment. Mobile device 110 is in communication with access node 310, which this time comprises a base station and computer-readable media 312. Access node 310 is in communication with further network elements 314 and 318. Network elements 314 and 318 may be any elements with computer-readable media 316 and 320. For instance, network element 314 may be a switch, and network element 318 may be a gateway. At least one of the computer-readable media 312, 316, and 320 are operable to inspect a flow of data traffic between mobile device 110 and the PDN 118. Additionally, at least one of the computer-readable media 312, 316, and 320 may also contain data storage components to store network policies related to the flow of data traffic, data-packet attributes relevant to the network polices, and relevant data attribute values. At least one of them may also contain logic for applying the network policies to the flow of data, and may be operable to regulate the flow of data traffic based on the network polices.

Figure 4:
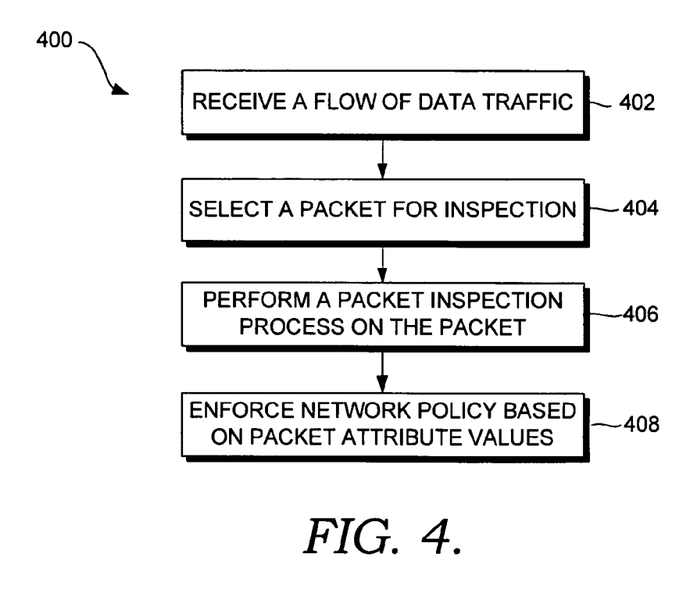
FIG. 4 is a flow chart describing an illustrative method in which the flow of data traffic communicated between a mobile device and a wireless telecommunications network may be regulated in accordance with an embodiment of the invention.

FIG. 4 depicts an illustrative method in which the flow of data traffic communicated between a mobile device and a wireless telecommunications network may be regulated. The method 400 begins at step 402 where a flow of data-packets is received by an access node in a wireless telecommunications network as discussed previously in reference to FIGS. 1-3. A data-packet is then selected for inspection in step 404. In an alternate embodiment, multiple data-packets are selected from the flow for inspection. A data-packet inspection process is then performed on the data-packet in step 406. In this step, a number of different data-packet attributes may be inspected such as a user identifier attribute, which identifies a user associated with a mobile device from which the data-packet originated; an application identifier, which identifies the application from which the data-packet originated; a mobile device identifier, which identifies a mobile device from which the data-packet originated; and a sector identifier that identifies the portion of the wireless coverage area from which the data-packet originated. Additional attributes may also be inspected.

Once the inspection process has completed, a network policy may then be enforced based on the value of a data-packet attribute in step 408. This may be accomplished by designating a criteria for the value of the data-packet attribute in that if the data-packet attribute value meets the criteria, then the network policy is enforced Likewise if the data-packet attribute does not meet the criteria, then the network policy is not enforced. For instance, the network policy may require that if a certain data-packet attribute is a first value, then the network policy will be enforced. However, if the data-packet attribute is a second value, then the network policy will not be enforced.

The network policy may be based on the wireless coverage area, such as a sector; the application; or the subscriber from which the data-packet originates. The network policy should also determine the way in which to regulate the flow of data if a policy applies to that particular flow. For instance, a policy may be enforced by applying rate capping to the flow of data. It may also be enforced by limiting the total amount of data that may be transmitted by a particular flow. Furthermore, a policy may be enforced by prioritizing one flow of data over another. An example of a potential network policy is a policy that calls for the rate capping of data flows relating to certain applications such as bit torrent applications. Such a policy would insure that data flowing between a bit torrent client application on a mobile device and the wireless telecommunications network would flow at a lower rate than data flows relating to other types of applications.

Enforcement of the network policy may be implemented by setting the value of a reverse activity bit (RAB) for the wireless coverage area. For instance, setting the value of the RAB to one will regulate the rate of the flow of data between the mobile device and the access node. Alternatively, setting the value of the RAB to zero will end the regulation of the rate of the flow of data between the mobile device and the access node. The RAB could be set on the carrier, sector, or base transceiver station level depending on where the packet inspection hardware is located. The packet inspection could be done at the base station, radio core network, or switch.

Figure 5:
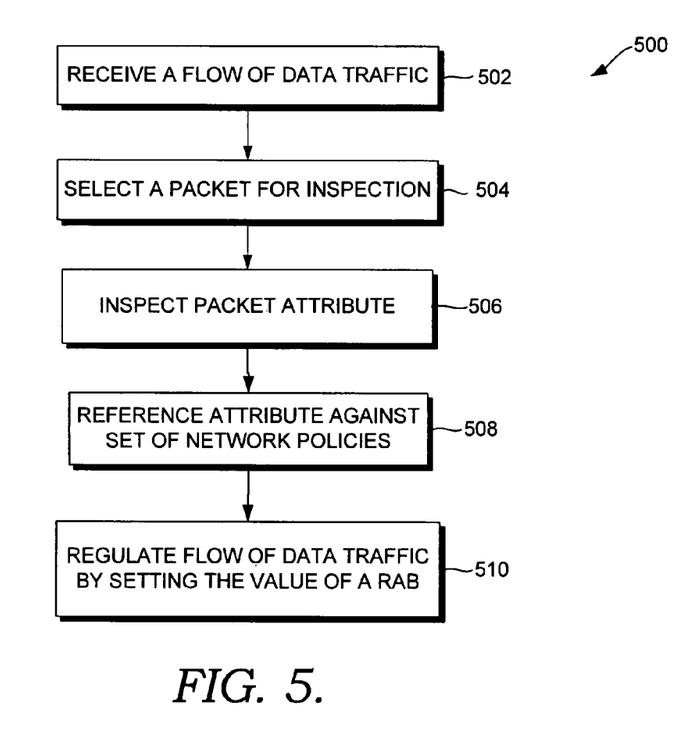
FIG. 5 is a flow chart describing an illustrative method in which the flow of data traffic communicated between a mobile device and a wireless telecommunications network may be regulated in accordance with an embodiment of the invention.

FIG. 5 depicts another illustrative method in which the flow of data traffic communicated between a mobile device and a wireless telecommunications network may be regulated. The method 500 begins at step 502 where a flow of data-packets are received by an access node in a wireless telecommunications network. A data-packet is then selected for inspection in step 504. Similar to step 406 in FIG. 4, a data-packet inspection process is then performed on the data-packet in step 506. As was previously mentioned, a number of different data-packet attributes may be inspected such as a user identifier attribute, which identifies a user associated with a mobile device; an application identifier, which identifies the application from which the data-packet originated; a mobile device identifier, which identifies a mobile device; and a sector identifier that identifies the portion of the wireless coverage area from which the data-packet originated. Additional attributes may also be inspected.

In step 508, the data packet attribute value is referenced against a set of network policies. As was discussed previously, the network policies could be based on the sector from which a data-packet originates, the application from which the data-packet originates, or the subscriber from which the data packet originates. Additionally, once the data-packet attribute has been referenced to the set of network policies, the flow of data traffic from which the data-packed originated could then be regulated at step 510 by setting the value of a RAB. Setting the RAB value could be done in connection with a sector, carrier, or base transceiver station in the wireless coverage area. Furthermore, the enforcement of the set of network policies may be accomplished by applying rate capping to the flow of data, limiting the total amount of data that may be transmitted by a particular flow, or prioritizing one flow of data over another.

Figure 6:
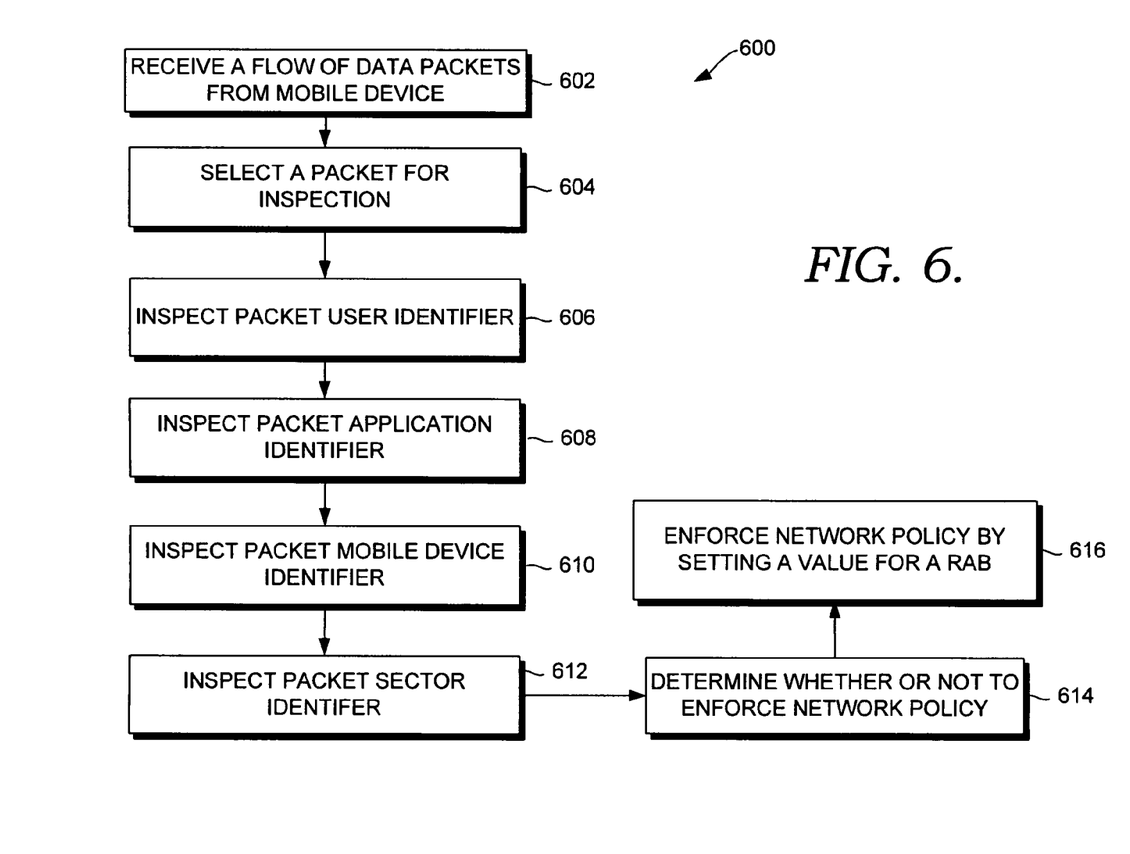
FIG. 6 is a flow chart describing an illustrative method in which the flow of data traffic communicated between a mobile device and a wireless telecommunications network may be regulated in accordance with an embodiment of the invention.

FIG. 6 depicts yet another illustrative method in which the flow of data traffic communicated between a mobile device and a wireless telecommunications network may be regulated. The method 600 begins at step 602 where a flow of data-packets are received by an access node in a wireless telecommunications network. A data-packet is then selected for inspection in step 604. In step 606, data-packet attribute inspection begins, specifically, the user identifier attribute is inspected. In steps 608, 610, and 612, the data-packet application identifier, mobile device identifier, and sector identifier attributes are inspected respectively. Note that the attributes may be inspected in any order. Based on the values of these data-packet attributes, the system then determines whether or not to enforce a network policy in step 614. In step 616, the policy is enforced by setting the value for a RAB associated with the flow of data from which the data packed originated. As previously discussed, the value of the RAB may be set for a sector, carrier, or base transceiver station in connection with the wireless coverage area.

Figure 7:
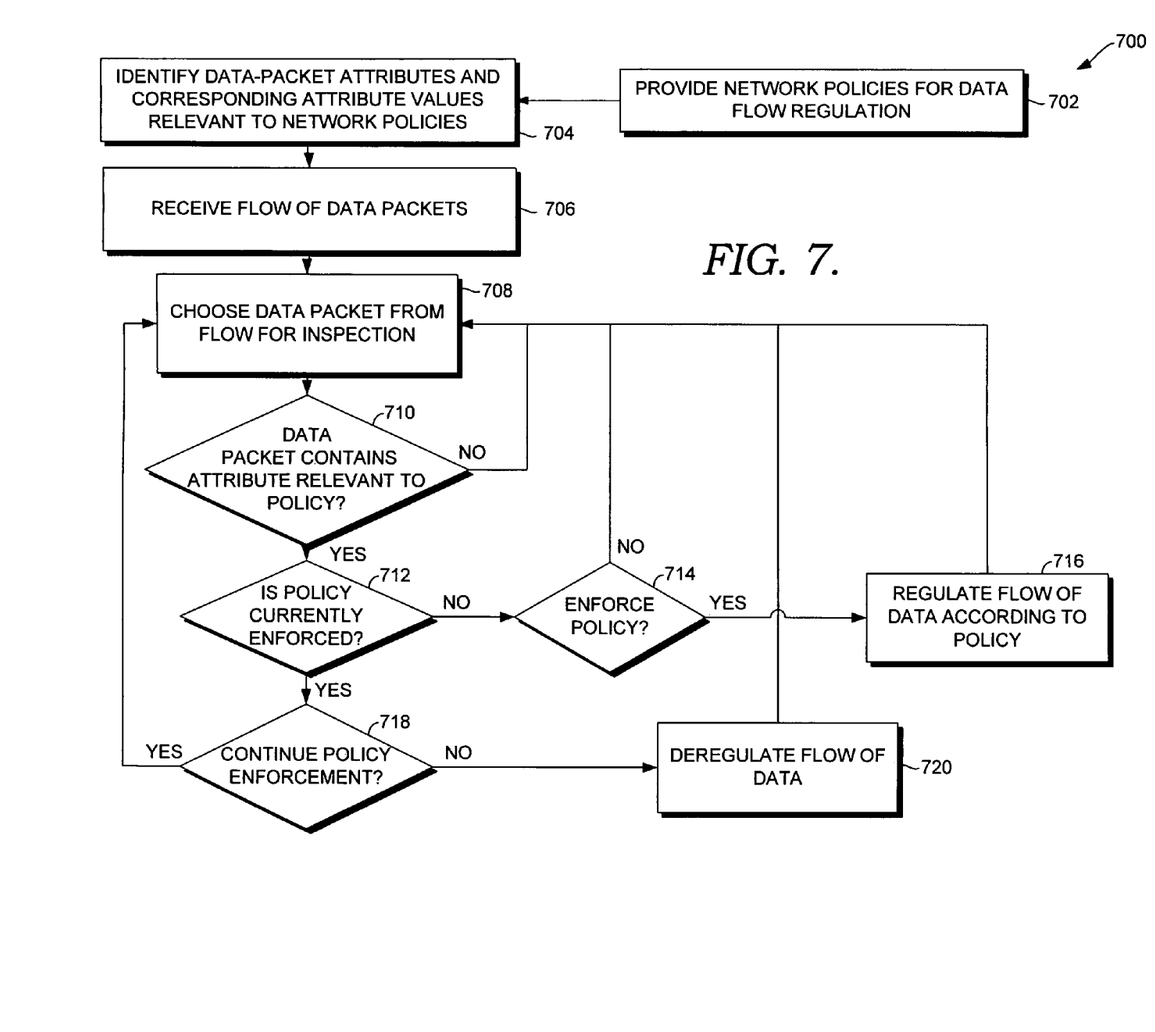
FIG. 7 is a flow chart describing an illustrative method in which the flow of data traffic communicated between a mobile device and a wireless telecommunications network may be regulated in accordance with an embodiment of the invention.

FIG. 7 depicts an illustrative method in which the flow of data traffic communicated between a mobile device and a wireless telecommunications network may be regulated. The method 700 begins at a step 702 where network policies relating to the regulation of the flow of data traffic in a wireless telecommunications network are provided. These network policies may be any policy relating to the regulation of the flow of data traffic that is communicated between a mobile device and a telecommunications network. For instance, the network policies may be related to improving the quality of service for subscribers of the wireless telecommunications service.

The policies may be based on the wireless coverage area, such as a sector, from which the data-packet originates; the application from which the data-packet originates; or the subscriber from which the data-packet originates. The network policies should also determine the way in which to regulate the flow of data if a policy applies to that particular flow. For instance, a policy may be enforced by applying rate capping to the flow of data. It may also be enforced by limiting the total amount of data that may be transmitted by a particular flow. Furthermore, a policy may be enforced by prioritizing one flow of data over another. An example of a potential network policy is a policy that calls for the rate capping of data flows relating to certain applications such as bit torrent applications. Such a policy would insure that data flowing between a bit torrent client application on a mobile device and the wireless telecommunications network would flow at a lower rate than data flows relating to other types of applications.

At a step 704, a network provider identifies data-packet attributes relevant to the network policies they wish to enforce. These attributes are used to help determine whether or not a policy needs to be enforced. Such attributes could include a user identifier that identifies a user associated with a mobile device, an application identifier that identifies a particular application being used by a user, a mobile device identifier that identifies a certain mobile device, and a sector identifier that identifies a portion of a wireless coverage area. Additional identifiers may also be used. Furthering the previous example, an attribute associated with a policy involving the rate capping at the data flow of certain applications may be an application identifier.

A flow of data is received from a mobile device at a step 706. The attributes of a data-packet from the flow are inspected at a step 708. A determination is made at a step 710 as to whether the data-packet contains attributes relevant to any network policies. If none are relevant, then another data-packet from the flow may be inspected at a step 708. But if the data-packet contains attributes relevant to at least one network policy, then the system will determine if the policy is already enforced in the wireless coverage area at a step 712. If the policy is not being enforced, then the system will decide whether to enforce the policy based on the value(s) of the relevant data-packet attribute(s) at a step 714. This may be accomplished by, for example, comparing the value of the data-packet attribute to a list of values deemed relevant. If the policy need not be enforced, then another data-packet from the flow of data may be inspected 708. However, if the policy is to be enforced, then the system will begin regulating the flow of data traffic as specified by the network policy 716. The regulation may be achieved by setting the value of a Reverse Activity Bit (RAB) for the wireless coverage area to one.

Setting the value of the RAB to one will regulate the rate of the flow of data between the mobile device and the access node. Alternatively, setting the value of the RAB to zero will end the regulation of the rate of the flow of data between the mobile device and the access node. The RAB could be set on the carrier, sector, or base transceiver station level depending on where the packet inspection hardware is located. The packet inspection could be done at the base station, radio core network, or switch. Once the enforcement of the policy has begun, another data-packet may be inspected 708.

Returning to step 712, if the policy is being enforced, then the system will determine whether or not to continue enforcing the policy at a step 718. As described in reference to step 714, this may be accomplished by comparing the value of the data-packet attribute to a list of values deemed relevant. If enforcement of the policy is to continue, another data-packet from the flow of data may be inspected 708. Alternatively, if the data-packet attribute value is such that the policy need not be enforced any longer, then the system may cease regulation of the flow of data traffic as determined by the network policy at a step 720. As discussed previously, this may be achieved by setting the value of a RAB for a wireless coverage area to zero. Additional data-packets may then be inspected 708.

Figure 8:
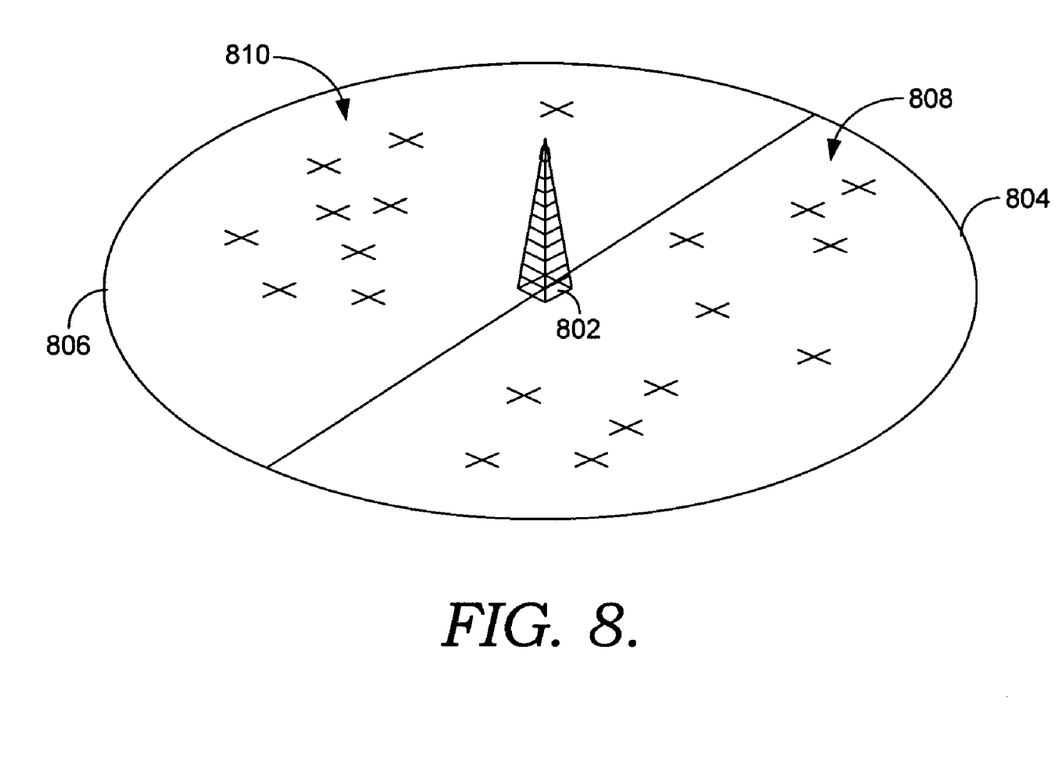
FIG. 8 depicts a wireless coverage area in a wireless telecommunications network where the flow of data traffic communicated between a plurality of mobile devices may be regulated in accordance with an embodiment of the invention.

FIG. 8 depicts an access node 802 in a wireless coverage area that is divided into sectors 804 and 806. Note that wireless coverage area 802 could contain more or less sectors; two are shown for illustrative purposes. Additionally, sectors 804 and 806 may belong to more than one wireless coverage areas. In each sector, there is a plurality of users with mobile devices 808, 810 transmitting a flow of data to the access node 802. As an illustration, assume that the network provider has created a policy dictating that the flow of data coming from high-priority subscribers in sector 804 should be prioritized higher than the flow of data coming from low-priority subscribers in sector 806.

Therefore, as the access node of the wireless coverage area 802 receives flows of data from the pluralities of mobile devices 808 and 810 in sectors 804 and 806, some or all of the data-packets contained in a flow of data may be inspected to determine from what sector the data-packets originated. If the data-packets originated from sector 806, the low-priority sector, a RAB value of 1 may be set to regulate the flow of data coming from sector 806 in such a way that the flow of data coming from sector 804 has a higher priority. Note that this example assumes that most of the traffic in sector 804 is from high-priority subscribers whereas most of the traffic in sector 806 is from low-priority subscribers. In this scenario, sector 804's traffic can be prioritized over sector 806's traffic by setting the value of the RAB to one on sector 806. However traffic prioritization within sector 804 itself cannot be done by setting/re-setting the value of the RAB, since it may impact all subscribers within the sector. Many other potential scenarios are possible. Additionally, a wireless telecommunications network may have a plurality of network policies for regulating the flow of data traffic.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of regulating a flow of data traffic that is communicated from a mobile device in a wireless coverage area to a wireless telecommunications network, the method comprising: performing a packet-inspection process on a portion of the flow of data traffic that is communicated from the mobile device to the wireless telecommunications network, wherein the packet-inspection process comprises selecting a data packet from a plurality of data packets within the flow and inspecting data-packet attributes within the data packet that include a user identifier attribute that identifies a user associated with the mobile device, an application identifier attribute that identifies an application from which the data packet originates, a mobile device identifier attribute that identifies the mobile device, and a sector identifier attribute that identifies a portion of the wireless coverage area; and based on a value of a data-packet attribute, determining whether to enforce a network policy such that if the value of the data-packet attribute is a first value, then the network policy will be enforced but if the value of the data-packet attribute is a second value, then the network policy will not be enforced, wherein enforcing the network policy includes regulating the flow of data traffic that is communicated from the mobile device to an access node of the wireless telecommunications network, wherein enforcement of the network policy includes prioritizing a flow of data traffic from a first type of application over a flow of data traffic from a second type of application, wherein the flow of data traffic from the second type application is regulated to flow at a lower rate than the flow of data traffic from the first type of application and wherein the enforcement of the network policy is implemented by setting a value of a reverse activity bit (RAB) associated with the flow of data traffic.

2. The media of claim 1, wherein the enforcement of the network policy includes rate capping at least a portion of the flow of data traffic from the mobile device in the wireless coverage area.

3. The media of claim 1, wherein the enforcement of the network policy includes limiting the amount of data transferred in at least a portion of the flow of data traffic in the wireless coverage area.

4. The media of claim 1, wherein the network policy is one of a set of network policies that are based on at least:
   a sector from which the data packet originates;
   an application from which the data packet originates; and
   a subscriber from which the data packet originates.

5. A method for regulating a flow of data traffic from a mobile device, the method comprising: providing a set of network policies that determine how the flow of data traffic from the mobile device to an access node of a wireless communications network is regulated, wherein the set of network policies includes prioritizing a flow of data traffic from a first type of application over a flow of data traffic from a second type of application, wherein the flow of data traffic from the second type application is regulated to flow at a lower rate than the flow of data traffic from the first type of application; inspecting data-packet attributes within a data packet that forms a portion of the flow of data traffic from the mobile device, wherein the data-packet attributes include a sector identifier attribute that identifies a sector from which sector a data packet originates, an application identifier attribute that identifies an application from which the data packet originates, and a user identifier attribute that identifies a user associated with the mobile device; referencing the attributes against the network policies, wherein a value of an attribute is utilized to select one of the network policies; and based on the referencing, regulating the flow of data traffic consistent with the one of the network policies, wherein the regulation of the flow involves setting a value of a reverse activity bit (RAB) associated with the flow of data traffic.

6. The method of claim 5, wherein setting the value of the RAB is done on a sector in connection with the wireless coverage area.

7. The method of claim 5, wherein setting the value of the RAB is done in connection with a carrier in the wireless coverage area.

8. The method of claim 5, wherein setting the value of the RAB is done in connection with a base transceiver station (BTS) in the wireless coverage area.

9. The method of claim 5, wherein the enforcement of the set of network policies involves rate capping at least a portion of the flow of data traffic in the wireless coverage area.

10. The method of claim 5, wherein the enforcement of the set of network policies involves limiting the amount of data transferred in at least a portion of the flow of data traffic in the wireless coverage area.

11. The method of claim 5, wherein the enforcement of the set of network policies involves prioritization of at least a portion of the flow of data traffic in the wireless coverage area.

12. The method of claim 5, wherein the attribute is one of the following:
   a user identifier that identifies a user associated with a mobile device;
   an application identifier that identifies an application from which the data packet originates;
   a mobile device identifier that identifies a mobile device; and
   a sector identifier that identifies a portion of the wireless coverage area.

13. One or more non-transitory computer-readable media having computer-useable instructions embodied thereon for performing a method of regulating a flow of data traffic that is communicated from a mobile device to a wireless telecommunications network, the method comprising: receiving the flow of data packets from the mobile device in a wireless coverage area; inspecting attributes of each data packet in the flow, wherein a user identifier, an application identifier, a mobile device identifier, and a sector identifier are available for inspection in each data packet, each attribute having a corresponding value; based on one or more of the corresponding values, determining whether or not to enforce a network policy that regulates a flow rate of the flow of data packets from the mobile device, wherein enforcement of the network policy includes prioritizing a flow of data traffic from a first type of application over a flow of data traffic from a second type of application, wherein the flow of data traffic from the second type application is regulated to flow at a lower rate than the flow of data traffic from the first type of application; and enforcing the network policy by way of setting a reverse-activity-bit (RAB) value associated with the flow.

14. The media of claim 13, wherein setting the RAB value is done on a sector in connection with the wireless coverage area.

15. The media of claim 13, wherein setting the RAB value is done in connection with a carrier in the wireless coverage area.

16. The media of claim 13, wherein setting the RAB value is done in connection with a base transceiver station (BTS) in the wireless coverage area.

17. The media of claim 13, wherein the network policy is based on at least one of a sector from which a data packet originates, an application from which a data packet originates, and a subscriber from which a data packet originates.

18. The media of claim 13, wherein the enforcement of the network policy includes at least one of rate capping, limiting the amount of data transferred, and prioritization of at least a portion of the flow in the wireless coverage area.

* * * * *